United States Patent

Zywiak

Patent Number: 5,461,882
Date of Patent: Oct. 31, 1995

[54] REGENERATIVE CONDENSING CYCLE

[75] Inventor: Thomas M. Zywiak, Suffield, Conn.

[73] Assignee: United Technologies Corporation, Hartford, Conn.

[21] Appl. No.: 278,822

[22] Filed: Jul. 22, 1994

[51] Int. Cl.[6] .................................................. F25D 9/00
[52] U.S. Cl. .................................... 62/401; 62/402; 62/87
[58] Field of Search ........................... 62/87, 401, 402

[56] References Cited

U.S. PATENT DOCUMENTS

| | | | |
|---|---|---|---|
| 2,767,561 | 10/1956 | Seeger | 62/136 |
| 3,877,246 | 4/1975 | Schutze | 62/402 |
| 4,021,215 | 5/1977 | Rosenbush et al. | 62/402 |
| 4,127,011 | 11/1978 | Giles et al. | 62/402 |
| 4,198,830 | 4/1980 | Campbell | 62/402 X |
| 4,265,397 | 5/1981 | Rannenberg | 62/402 X |
| 4,334,411 | 6/1982 | Payne | 62/86 |
| 4,347,714 | 9/1982 | Kinsell et al. | 62/402 |
| 4,374,469 | 2/1983 | Rannenberg | 62/402 |
| 4,684,081 | 8/1987 | Cronin | 244/58 |
| 4,829,775 | 5/1989 | Defrancesco | 62/402 X |
| 4,963,174 | 10/1990 | Payne | 62/87 |
| 5,014,518 | 5/1991 | Thomson et al. | 62/402 X |
| 5,086,622 | 2/1992 | Warner | 62/88 |
| 5,249,934 | 10/1993 | Merritt et al. | 62/402 X |
| 5,309,724 | 5/1994 | Schreiber et al. | 62/87 |
| 5,309,735 | 5/1994 | Maher, Jr. et al. | 62/402 |
| 5,323,624 | 6/1994 | Schwalm | 62/401 |
| 5,373,707 | 12/1994 | Ostersetzer et al. | 62/401 |

Primary Examiner—Christopher Kilner
Attorney, Agent, or Firm—Richard H. Kosakowski; Holland & Associates

[57] ABSTRACT

An air cycle environmental control system for an aircraft cabin is disclosed which utilizes cabin exhaust air to power a first stage turbine. This provides a significant increase in compressor power which increases the turbine cooling available in a second stage turbine. The ram air consumption is also reduced due to the cabin exhaust air being ported to the ram air inlet where it merges with the ram air prior to cooling of the bleed air supply in a dual heat exchanger.

11 Claims, 2 Drawing Sheets

REGENERATIVE CONDENSING CYCLE

BACKGROUND OF THE INVENTION

This invention relates to the refrigeration portion of an air cycle environmental control system for an aircraft cabin.

Environmental control systems ("ECS") for aircraft are known to have a refrigeration portion that employs either a two, three or four wheel air cycle machine ("ACM"). The ECS is used to cool, filter, dehumidify, pressurize and otherwise condition the air supplied to the cabin. In most installations, the ECS utilizes a source of hot compressed air, such as from the engine compressor section (during aircraft flight with the engines operating), the auxiliary power unit ("APU") (during ground operation), or both. The hot pressurized-bleed air is then expanded and cooled in the ACM to provide a cool, fresh air supply to the cabin. Numerous schemes for accomplishing this result are known in the art. See, for example, U.S. Pat. Nos. 2,767,561; 4,265,397; 4,334,411; 4,374,469; and 5,086,622.

Most modern environmental control systems use ram cooling air to initially cool the relatively hot, pressurized bleed air before the bleed air is presented to the ACM. The ram air is vented from the ambient air rushing by the moving aircraft. However, ram air usage presents a relatively small, yet significant amount (approximately 2½%) of the total aerodynamic drag or resistance of the aircraft. Increased drag translates into increased fuel consumption. Thus, the aerodynamic drag associated with the use of ram air for cooling purposes is a major ECS operating penalty.

It is also known in the art to provide a three wheel ACM for use on aircraft that utilizes a high-pressure water separation concept to deliver a sub-freezing air supply. Therein, condensate is removed from the bleed air upstream of a cooling turbine. The warm bleed air is cooled in the condenser to a temperature below its dewpoint by the cooler turbine exhaust air. After the water condensate is separated out and removed from the bleed air, the resulting dehumidified air is reheated prior to entering the cooling turbine. Reheaters restore much of the thermodynamic efficiency loss caused by the separation process. This high-pressure water separation concept can supply air close to 0° F., thereby reducing the airflow required to cool the cabin, further saving on engine fuel consumption.

However, this sub-freezing, three wheel ACM refrigeration system is relatively inefficient thermodynamically when compared to a more modern four wheel ACM described in U.S. Pat. No. 5,309,735. Also, means must be provided for the sub-freezing system to prevent the accumulation of ice in the ducting due to the freezing of entrained moisture in the bleed air. As stated in U.S. Pat. No. 4,334.411, not all of the entrained moisture can possibly be removed from the bleed air. Therefore, warm air (i.e., air above the freezing point of water) must be introduced at various points into the system. The '411 patent illustrates one scheme for introducing warm air into a system employing a turbine that expands and cools air to a temperature below the freezing point of any water contained in the air.

Accordingly, it is a primary object of the present invention to provide an aircraft environmental control system that reduces the amount of ram air used to cool the engine bleed air.

It is a general object of the present invention to reduce ram air usage, thereby reducing aerodynamic drag of the aircraft.

Another object of the present invention is to eliminate the usage of sub-freezing heat exchangers found in prior art three wheel ACM designs, thereby reducing the weight of the main heat exchangers.

It is a further object of the present invention to provide an environmental control system that is significantly more fuel efficient than prior art designs.

It is another object of the present invention to expand the cabin exhaust air in a turbine portion of the ACM to increase the power provided to a compressor rotor portion of the ACM, therein reducing the needed bleed air pressure for a required cabin air flow, the reduced amount of pressure for the bleed air translating into a more fuel efficient system.

The above and other objects and advantages of the present invention will become more readily apparent when the following description is read in conjunction with the accompanying drawings.

SUMMARY OF THE INVENTION

To overcome the deficiencies of the prior art and to achieve the objects listed above, the Applicant has invented an improved aircraft environmental control system having a refrigeration portion that utilizes a regenerative condensing cycle to reduce ram air requirements for initial cooling of a hot, pressurized air that is input to the refrigeration portion of the environmental control system.

In the preferred embodiment, the environmental control system comprises an air conditioning system that utilizes a four wheel air cycle machine. A source of hot pressurized air, such as an aircraft engine compressor or an auxiliary power unit, provides the bleed air to the hot path of a primary heat exchanger. The ambient ram air cools the bleed air. The bleed air is then fed through a compressor stage of the air cycle machine, and then through a secondary heat exchanger where it is again cooled by ram air. The bleed air is then fed through a condensing heat exchanger that, in an aircraft cruise mode, is used as a point of heat rejection. The bleed air is then expanded and cooled in a second turbine of the air cycle machine and is eventually fed to the crew and passenger compartments of the cabin.

In an aircraft cruise mode, the cabin exhaust or return air is heated by the bleed air from the secondary heat exchanger in a reheater portion of a condensing heat exchanger and is expanded and cooled by a first turbine of the air cycle machine. The cabin exhaust air then flows through the cold side of the condenser, where it is further heated by the bleed air from the secondary heat exchanger. The cabin exhaust air is then ported into the ram air upstream of the primary and secondary heat exchangers. By feeding the cabin exhaust air into the ram air, the amount of ram air is significantly reduced, thereby reducing the aerodynamic ram drag on the aircraft. Empirically, it has been discovered that the above regenerative condensing cycle configuration provides for a 40–60 percent reduction in ram air usage over current known designs. The system of the present invention is "regenerative" in the sense that cabin exhaust air is recirculated, instead of merely being dumped overboard, to provide regenerative heat exchange between the exhaust air and the bleed air. That is, the cabin exhaust air provides an added point of heat rejection for the engine bleed air. Further, the required cabin air conditioning pack inlet pressure during aircraft cruise operation is decreased due to the added compressor pressure ratio supplied by the increase in turbine power created by the recirculated cabin air exhaust. That is, utilizing the cabin air exhaust to power the first stage turbine provides a significant increase in compressor power, which increases the turbine cooling available in the second stage turbine. This reduces ram air consumption. In the prior art, typically the engine bleed air is cooled only in the dual heat exchanger.

DETAILED DESCRIPTION OF THE PREFERRED EMBODIMENT

Figure 1:
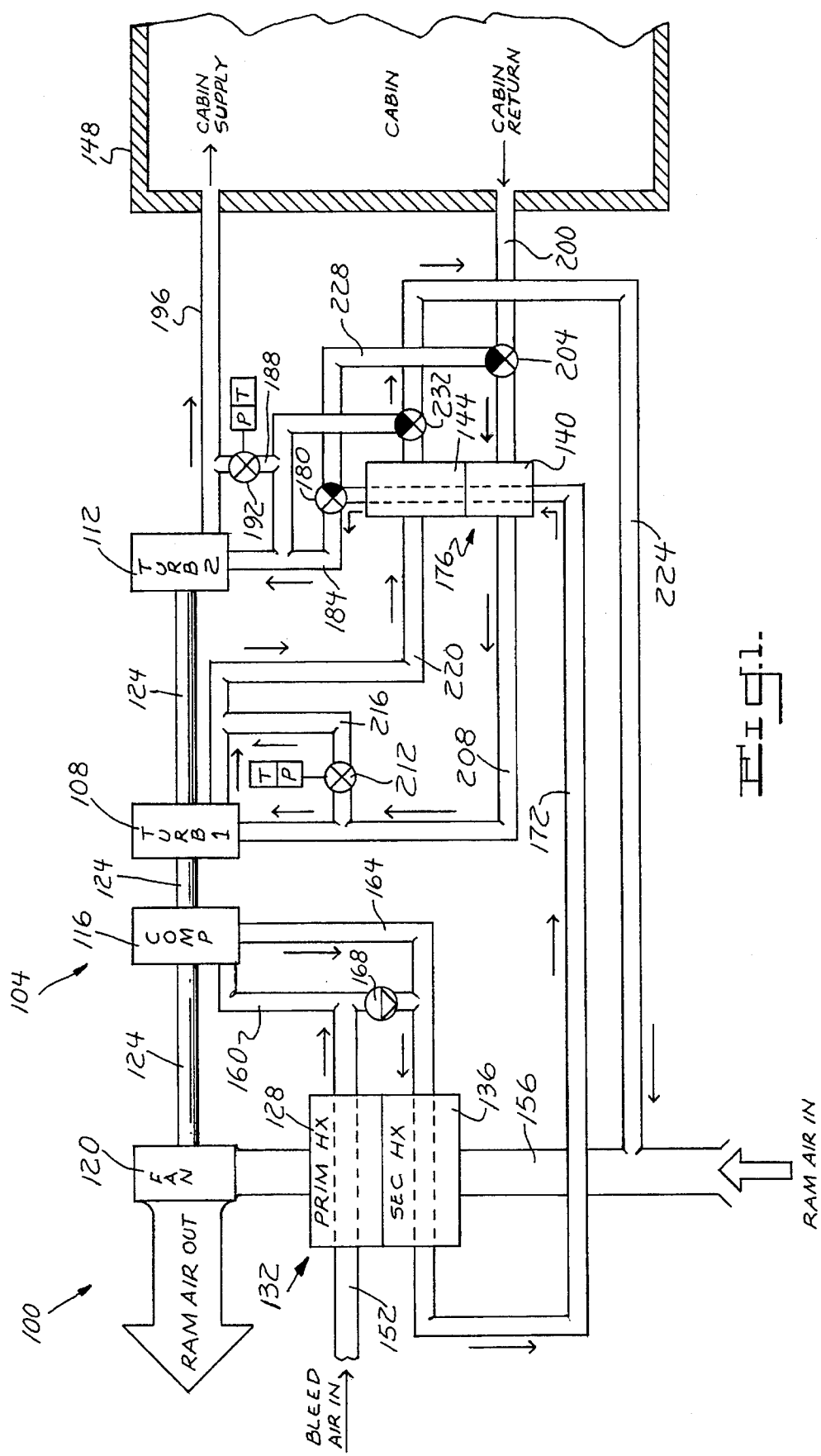
FIG. 1 is a schematic illustration of an air cycle environmental control system operative in an aircraft cruise mode in accordance with the present invention.

Referring to the drawings in detail, an air cycle refrigeration section of an aircraft air cycle environmental control system is illustrated therein and generally designated by the reference numeral 100. The refrigeration section 100 includes a four wheel air cycle machine ("ACM") 104 that includes first and second turbines 108, 112, a compressor 116 and a fan 120 all connected by a common rotatable shaft 124. A primary heat exchanger 128 section of a dual heat exchanger 132 cools the hot pressurized bleed air from an engine (not shown) or an auxiliary power unit ("APU") (not shown) and passes the cooled air to the compressor 116. The output of the compressor 116 is cooled by a secondary heat exchanger 136 portion of the dual heat exchanger 132 and is then fed to a reheater 140 and a condenser 144. The bleed air out of the condenser 144 is expanded in the second turbine 112 and may then be fed directly to a cabin 148 of the craft. Cabin air exhausted therefrom is fed through the reheater 140 and is expanded in the first turbine 108. The output of the first turbine 108 is then fed through the condenser 144 and to the ram air inlet where it merges with the ram air to aid in cooling the dual heat exchanger 132 and reducing the ram air requirements over prior art schemes.

Referring now to FIG. 1, there illustrated in detail is a schematic of the air cycle refrigeration section 100 of an aircraft ECS. The four wheel ACM 104 may be that described and claimed in U.S. Pat. No. 5,309,735 to Maher, Jr. et al., and assigned to the same assignee as that of the present invention, such patent being hereby incorporated by reference. The air cycle machine 104 has four wheels 108–120 mounted on a common shaft 124 for rotation therewith about a longitudinal axis. The ACM 104 includes a second stage turbine rotor 112 mounted at a first end of the shaft 124, a fan rotor 120 mounted to a second end of the shaft 124, a first stage turbine rotor 108 mounted to a central portion of the shaft 124, and a compresser rotor 116 mounted to the central portion of the shaft 124, e.g., in back-to-back relation to the first stage turbine rotor 108. The first and second turbine rotors 108, 112 are operative to extract energy from a flow of compressed air for driving the shaft 124, the fan rotor 120 and the compressor rotor 116 in rotation about the axis.

FIG. 1 illustrates the operation of the ACM 104 in accordance with the present invention in a cruise mode of aircraft operation. Bleed air readily available from either a compressor stage of a jet aircraft engine (not shown) or from an auxiliary power unit (APU) (not shown) is fed on a duct 152 to a cold path of a primary heat exchanger 128 that forms part of a dual heat exchanger 132. The bleed air is typically a hot, pressurized air from the engine or APU. Typically during aircraft flight, the bleed air is provided by the engine compressor stage. Conversely, during ground operation when the main aircraft engines are not running, the bleed air is provided by the APU.

The bleed air is cooled initially in the primary heat exchanger 128 by ram air fed to the warm path of the exchanger 128 along a duct 156 or flowpath. The ram air is ambient air vented from outside the craft that is much cooler than the bleed air. The fan rotor 120 is disposed downstream of the primary heat exchanger 128 and is used to urge or assist the ram air flow through the dual heat exchanger 132. After passing through the primary heat exchanger 128 where it is cooled to approximate ambient temperature, the bleed air is fed on a duct 160 to the compressor rotor 116. The compressed bleed air output from the compressor 116 on a duct 164 then passes through the secondary heat exchanger 136. The primary and secondary heat exchangers 128, 136 may be housed in a single unit and be of the, e.g., plate fin type, wherein the hot and cold paths of each heat exchanger are in a cross-flow heat exchange relationship. In a similar manner to the primary heat exchanger 128, ram air is used to cool the compressed bleed air passing through the cold side of the secondary heat exchanger 136 by removing the heat of compression. After passing through the dual heat exchanger 132, the fan 120 forcibly discharges the ram air overboard. Although not shown, a valve may be provided in the fan exhaust duct and may be modulated to regulate the flow rate of the ram cooling air. In the event of a failure of the compressor 116, a check valve 168 allows the bleed air to bypass the compressor 116.

In the foregoing description and in the description that follows, a number of arrowheads are placed on the figures to illustrate the direction of the flow of the various fluids in the corresponding ducts or flow paths.

After emerging from the secondary heat exchanger 136, the bleed air is fed on a duct 172 to the warm side of the reheater 140, which forms a part of a condensing heat exchanger 176. After passing through the reheater 140, the bleed air then flows through the warm path of the condenser 144 portion of the condensing heat exchanger 176 where the bleed air is further cooled. Upon exiting the warm path of the condenser 144, the bleed air passes through a diverter valve 180 that directs the air along a duct 184 into the inlet of the second stage turbine 112. This turbine 112 expands the bleed air to both extract energy from the air to drive the shaft 124 of the four wheel ACM 104, and also further cools the bleed air. If desired, a separate duct 188 may divert a portion of the bleed air exiting the condenser 144 and pass this air through a temperature control valve 192. The air passing through this valve 192 then mixes with the air exiting the turbine 112 on a duct 196 to better regulate the temperature of the air out of the second stage turbine 112. If desired, the bleed air output from the second stage turbine 112 may be fed directly to the cabin 148 of the craft. However, although not shown, the output of the second stage turbine 112 may, if desired, have air mixed in with it before passing the resulting conditioned air into the cabin 148. For example, the air used for mixing may be cabin return air, as taught in U.S. Pat. No. 5,086,622 to Warner and assigned to the same assignee as that of the present invention, and is hereby incorporated by reference. This may be desired if the second stage turbine 112 is operated to produce air at a sub-freezing temperature.

The foregoing description has traced the path of the bleed air as it is conditioned by the dual heat exchanger 132, the compressor 116, the condenser 144 and reheater 140 and the second stage turbine 112, while the bleed air flows along the appropriate duct or flow path in operation of the aircraft in a cruise mode. During altitude or cruise mode of the aircraft, the air is relatively dry. Thus, there is typically no need for moisture removal. Normally the condenser 144 and reheater 140 represent a pressure drop or penalty of the overall efficiency of the refrigeration cycle. However, as described hereinafter in more detail, the condenser 144 and reheater 140 utilize the bleed air along with the cabin exhaust air to provide for several increased system operating improvements; for example an increase in turbine power available for the compressor.

Still referring to FIG. 1, according to the present invention, the air exiting the cabin passes along a duct 200 and through a diverter valve 204 to the cold side of the reheater portion 140 of the condensing heat exchanger 176. This cabin exhaust air is typically 9 psi above ambient air pressure. The cabin return air is warmed by the bleed air from the secondary heat exchanger 136 passing through the warm side of the reheater 140. The cabin return air is then fed on a duct 208 to the input of the first stage turbine 108 where it is expanded and cooled. The first stage turbine 108 extracts energy from the cabin return air to drive the shaft 124 of the four wheel ACM 104. The first stage turbine 108 also cools the cabin exhaust air by expanding it. In a similar manner to the second stage turbine 112, a temperature control valve 212 is provided in a separate flow path 216 at the input of the first stage turbine 108 to bypass an amount of the cabin return air from passing into the first stage turbine 108, depending upon the temperature and pressure of the cabin return air after it passes through the reheater 140. The cabin return air exiting the first stage turbine 108 is then passed on a duct 220 through the cool side of the condenser 144 where it is heated by the bleed air passing through the hot or condensing path of the condenser 144. The cabin return air is then passed on a duct 224 to the inlet of the ram air duct 156 upstream of the dual heat exchanger 132.

At this point, the expanded cabin air temperature is typically warmer than the ram air temperature at a cruise altitude. However, the expanded cabin exhaust air still has the potential to provide cooling of the engine bleed air because the secondary heat exchanger hot inlet temperature is well above the cabin exhaust air temperature. The cabin exhaust air can then be used to displace ram air that otherwise would be cooling the hottest part of the secondary heat exchanger 136.

Normally the condenser 144 and reheater 140 portions of the condensing heat exchanger 176 are heat exchangers that perform their function of condensing ambient moisture during low altitude or ground operations of the aircraft. In the regenerative condensing cycle of the present invention, the reheater 140 and the condenser 144 are utilized in a novel way; that is, as a point of heat rejection in the system. Previously, only ram-cooled or liquid-cooled heat exchangers have been used to reject heat (i.e., act as a heat sink) in air cycle air conditioning systems.

By configuring the four wheel ACM 104 and associated components in this manner, the cabin air mixed with the ram air displaces the need for a like amount of ram air to be used to cool the dual heat exchanger 132. This reduction in ram air usage has the associated benefit of reducing the aerodynamic drag on the craft caused by the ram air. Empirical evidence has shown that the configuration of the present invention results in a reduction of ram air usage of from 40 to 60 percent over prior art configurations. Further, by using the cabin exhaust to power the first stage turbine 108, this provides a significant increase in compressor power which increases the turbine cooling available in the second stage turbine 112. Since the second stage turbine 112 cools the bleed air, this also reduces the amount of ram air needed to cool the bleed air.

Figure 2:
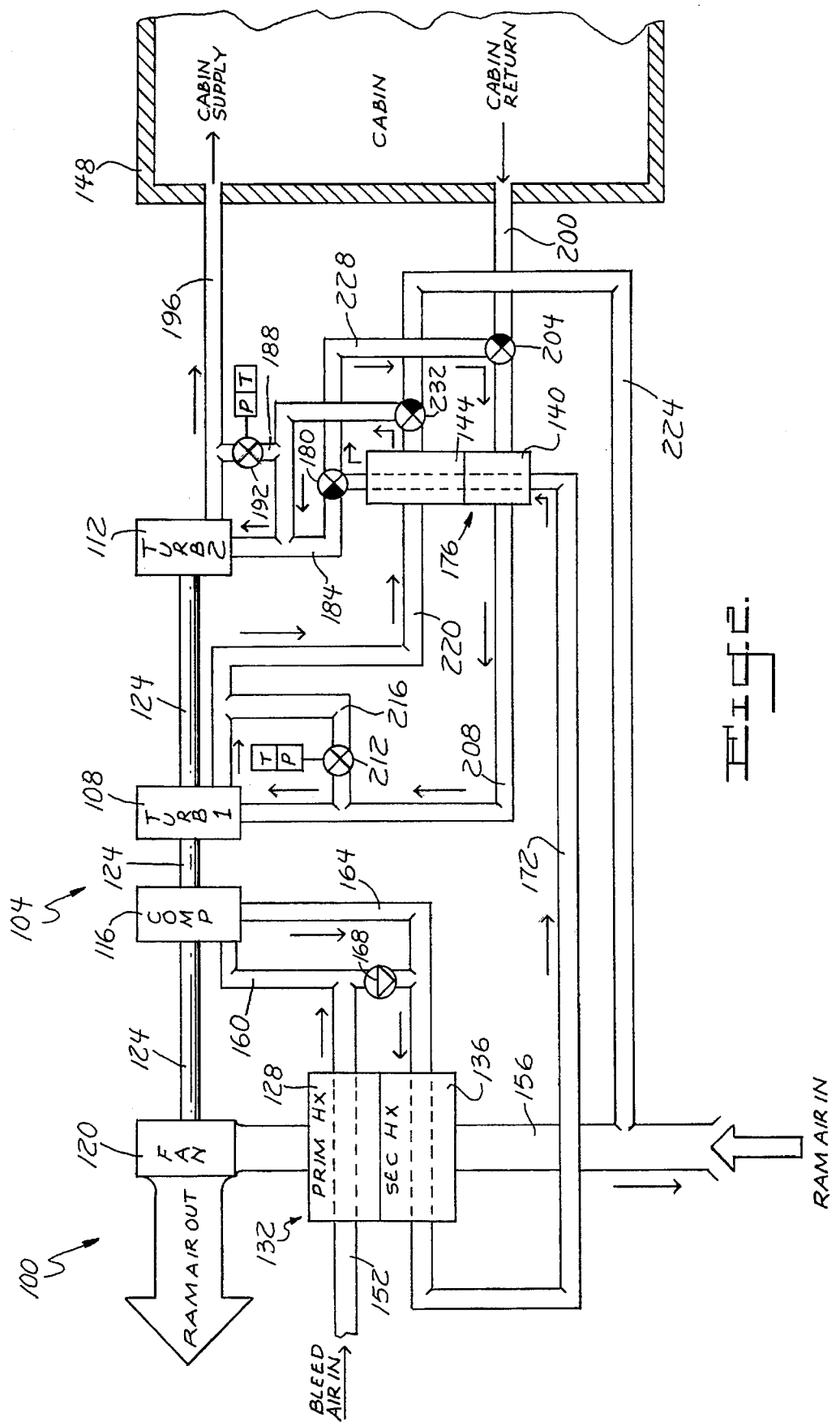
FIG. 2 is a schematic illustration of the air cycle environmental control system of FIG. 1 in operation in an aircraft non-cruise mode not in accordance with the present invention.

Referring now to FIG. 2, there illustrated is the same four wheel ACM 104 and other associated components including the dual heat exchanger 132 and the condensing heat exchanger 176, as in FIG. 1. Identical reference numbers are used in FIG. 2 to refer to elements identical to those in FIG. 1. The difference between FIG. 2 and FIG. 1 is in the mode of operation of the air cycle refrigeration system 100. In FIG. 1, the system 100 operated during a cruise mode of the aircraft. In contrast, the system 100 of FIG. 2 operates in a non-cruise mode, such as ground or low altitude operation. As such, there is less of a need for ram air to cool the bleed air that passes through the dual heat exchanger 132. Thus, the cabin return air is blocked from passing through the reheater 140 by the diverter valve 204 which is closed to the cabin return air. Further, the diverter valve 180 at the output of the condensing path of the condenser 144 is positioned such that the bleed air exiting the condenser 144 is not passed immediately to the second stage turbine 112, but instead is fed on a duct 228 through the cold side of the reheater 140 where it further cools the bleed air from the secondary heat exchanger 136. The air exiting the cool side of the reheater 140 is then expanded in the first stage turbine 108 and fed through the cold side of the condenser 144 where it assists in condensing out any entrained moisture in the bleed air. The corresponding arrowheads indicate the direction of airflows through the ducting and components. Although not shown, the water collected by a water collector at the condenser output may be routed to a spray nozzle located in the ram air duct 156 upstream of the dual heat exchanger 132. The water is sprayed on the ram air face of the core of the heat exchanger 132 to enhance heat exchanger performance through evaporative cooling.

The air exiting the cold side of the condenser is directed by a diverter valve 232 to be fed through the second stage turbine 112 where it is expanded and cooled. The air output from the second stage turbine 112 may then be fed into the cabin 148. In the alternative, it may be further conditioned as described hereinbefore in connection with U.S. Pat. No. 5,086,622, or in some other manner that should be apparent to one of ordinary skill in the art.

Thus, it is apparent from the foregoing that, in conjunction with FIG. 2, the air cycle refrigeration system 100 operates in a known manner and does not use the cabin exhaust air advantageously as in FIG. 1 in accordance with the present invention.

It should be understood by those skilled in the art that obvious structural modifications can be made without departing from the spirit of the invention. Accordingly, reference should be made primarily to the accompanying claims, rather than the foregoing specification, to determine the scope of the invention.

Having thus described the invention, what is claimed is:

1. An environmental control system for conditioning air prior to passing it to an area, comprising:

a. means for cooling air traveling along a first path using air from a first source, the first source air being fed along a second path to the means for cooling; and b. first turbine means for expanding and cooling the first path air, wherein conditioned air exhausted from the area is fed along a third path to the second path where it merges with the first source air and further comprising a second turbine means, disposed in the third path, for expanding and cooling the conditioned exhaust air prior to the conditioned air merging with the first source air and is used together with the first source air for cooling the first path air.

2. The environmental control system of claim 1, further comprising compressor means, disposed in the first path, for compressing the first path air.

3. The environmental control system of claim 2, wherein the means for cooling comprises a primary heat exchanger and a secondary heat exchanger, the first path air traveling through a cooling section of each of the primary heat exchanger and the secondary heat exchanger, the compressor means being disposed along the first path at a point between the primary heat exchanger and the secondary heat exchanger, the first source air being constrained to travel along the second path through a heating section of each of the primary heat exchanger and the second heat exchanger.

4. The environmental control system of claim 3, further comprising a condensing heat exchanger including a reheater and a condenser, the condensing heat exchanger being disposed in the first path, the first path air being constrained to travel through a cooling section of the reheater and a cooling section of the condenser, the conditioned exhausted air being constrained to travel through a heating section of the reheater and a heating section of the condenser, the second turbine means being disposed in the third path between the reheater and the condenser.

5. The environmental control system of claim 4, further comprising fan means for moving the first source air along the second path.

6. The environmental control system of claim 5, wherein the fan means, the first and second turbine means and the compressor means all comprise a four wheel air cycle machine having the fan means, the first and second turbine means and the compressor means connected by a rotatable shaft, the first turbine means comprising means for extracting energy from the first path air for rotating the shaft thereby rotating the compressor means and the fan means, the second turbine means comprising means for extracting energy from the conditioned exhausted air for rotating the shaft thereby rotating the compressor means and the fan means.

7. An air cycle air conditioning system for providing conditioned air to the cabin of an aircraft, the system comprising:

a. a primary heat exchanger for cooling bleed air traveling along a first flow path through use of ram air traveling along a second flow path;

b. a compressor, disposed in the first flow path, for compressing the bleed air from the primary heat exchanger;

c. a secondary heat exchanger for cooling the bleed air from the compressor on the first flow path through use of the ram air traveling along the second flow path;

d. a reheater for passing the bleed air on the first flow path in heat exchange relationship with conditioned air exhausted from the cabin and traveling along a third path;

e. a first turbine for expanding the exhausted conditioned air traveling along the third flow path from the reheater;

f. a condenser for passing the bleed air on the first flow path in heat exchange relationship with the exhausted conditioned air from the first turbine traveling along the third flow path, wherein the exhausted conditioned air from the condenser is passed along the third flow path to the second flow path where it merges with the ram air upstream of the primary and secondary heat exchangers to assist in cooling the bleed air passing through the primary and secondary heat exchangers; and g. a second turbine for expanding the bleed air on the first flow path from the condenser.

8. The system of claim 7, further comprising a fan disposed in the second flow path downstream of the primary and the secondary heat exchangers, for urging the ram air to pass through the primary and secondary heat exchangers.

9. The system of claim 8, wherein the compressor, the first and second turbines, and the fan comprise a four wheel air cycle machine; the compressor, the first and second turbines and the fan being mounted on a rotatable shaft; the first and second turbines being operable to extract energy from the exhausted conditioned air and the bleed air, respectively, during the expansion thereof for rotatably driving the shaft, the compressor and the fan.

10. An aircraft air conditioning system, comprising:

a. a four wheel air cycle machine including a fan rotor, a compressor rotor, a first stage turbine and a second stage turbine;

b. a dual heat exchanger having a primary heat exchanger and a secondary heat exchanger both operable to cool a bleed air by a ram air passing therethrough, the fan rotor operable to assist in the flow of ram air through the dual heat exchanger, the compressor rotor operable to compress the bleed air exiting the primary heat exchanger before passing it to the secondary heat exchanger; and c. a condensing heat exchanger including a reheater and a condenser, the reheater operable cool the bleed air exiting the secondary heat exchanger using cabin exhaust air, the cabin exhaust air exiting the reheater being expanded and cooled by the first stage turbine, the cabin exhaust air exiting the first stage turbine is fed to the condenser where it cools the bleed air exiting the reheater and passing through the condenser, the bleed air exiting the condenser being fed to the second stage turbine where it is expanded and cooled, the cabin exhaust air exiting the condenser being merged with the ram air upstream of the dual heat anger and assisting the ram air in cooling the bleed air in the dual heat exchanger.

11. The air conditioning system of claim 10, wherein the fan rotor, the compressor rotor, and the first and second stage turbines are all connected by a common rotatable shaft, the first stage turbine being operable to extract energy from the cabin exhaust air to rotate the shaft, the second stage turbine being operable to extract energy from the bleed air to rotate the shaft.

* * * * *